(12) United States Patent
Cramer et al.

(10) Patent No.: US 11,194,640 B2
(45) Date of Patent: *Dec. 7, 2021

(54) VALIDATION FRAMEWORK FOR RUNTIME CONNECTED API SYSTEMS

(71) Applicant: International Business Machines Corporation, Armonk, NY (US)

(72) Inventors: Keith D. Cramer, Pine Island, MN (US); Andrew R. Freed, Cary, NC (US); Tristan A. TeNyenhuis, West Islip, NY (US)

(73) Assignee: International Business Machines Corporation, Armonk, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/813,831

(22) Filed: Mar. 10, 2020

(65) Prior Publication Data

US 2020/0210258 A1 Jul. 2, 2020

Related U.S. Application Data

(63) Continuation of application No. 16/200,813, filed on Nov. 27, 2018, now Pat. No. 10,628,243.

(51) Int. Cl.
*G06F 9/44* (2018.01)
*G06F 9/54* (2006.01)
*G06F 16/953* (2019.01)

(52) U.S. Cl.
CPC ............ *G06F 9/547* (2013.01); *G06F 16/953* (2019.01)

(58) Field of Classification Search
CPC .................................................. G06F 9/547

USPC ........................................................ 719/318
See application file for complete search history.

(56) References Cited

U.S. PATENT DOCUMENTS

| 2008/0209451 | A1* | 8/2008 | Michels ................... G06F 9/54 719/328 |
| 2013/0179858 | A1 | 7/2013 | Mecke |
| 2016/0092344 | A1 | 3/2016 | Bally |
| 2016/0124742 | A1* | 5/2016 | Rangasamy ........ H04L 41/0803 717/103 |
| 2017/0060715 | A1* | 3/2017 | Ye ....................... G06F 11/2215 |

(Continued)

OTHER PUBLICATIONS

Citizen Canine, "Chaos Monkey," downloaded from <https://en.wikipedia.org/wiki/Chaos_Monkey> on Nov. 27, 2018.

(Continued)

*Primary Examiner* — Timothy A Mudrick
(74) *Attorney, Agent, or Firm* — Alexander G. Jochym (57) ABSTRACT

Provided is a validation framework for modelling possible failures that might occur when an orchestrated transaction calls external services to ensure that error handling and reporting is robust and well designed. The disclosed techniques ensure that no changes are necessary to either the code making a call or the services that might be called. The techniques are not limited to web servers and REST APIs as they may be used to test and validate any kind of system that employs well defined APIs. The claimed subject matter, or "validation framework" may be added to an existing API or created as a new module that acts as a proxy server in a non-micro service type of system. Although described with respect to a gateway-API service, the claimed subject matter is equally applicable to other systems that process orchestrated transactions.

20 Claims, 10 Drawing Sheets

(56) References Cited

U.S. PATENT DOCUMENTS

2017/0242784 A1    8/2017  Heorhiadi
2018/0267847 A1*   9/2018  Smith ................. G06Q 20/322

OTHER PUBLICATIONS

Techbeacon, "How to perform API testing with REST Assured," downloaded from <https://techbeacon.com/how-perform-api-testing-rest-assured> on Nov. 27, 2018, copyrighted 2015.
Cramer et al., "Validation Framework for Runtime Connected API Systems", U.S. Appl. No. 16/200,813, filed Nov. 27, 2018, 31 pages.
Appendix P—List of IBM Patents or Patent Applications Treated as Related, Filed herewith, 2 Pages.
"Chaos Engineering", Wikipedia, This page was last edited on Jul. 19, 2021, 8 Pages, <https://en.Wikipedia.org/wiki/Chaos_engineering>.
GitHub—Netflix/Chaosmonkey, downloaded from the Internet on Jul. 19, 2021, 3 Pages, <https://github.com/Netflix/chaosmonkey>.

\* cited by examiner

Figure 10

VALIDATION FRAMEWORK FOR RUNTIME CONNECTED API SYSTEMS

FIELD OF DISCLOSURE

The claimed subject matter relates generally to application programming interfaces (APIs) and, more specifically, to the modeling of failure scenarios that may occur when calling API related services.

BACKGROUND OF THE INVENTION

Many web application systems employ standard interfaces such as Representational State Transfer (REST) interfaces. Interfaces such as REST interfaces typically include programming application interfaces (APIs). One popular method of building application systems is to employ a micro-services architecture. In such an architecture, an API that aggregates the interfaces of multiple other services needed for a full system is created. For example, a gateway API allows a caller to call a single interface with a transaction that is orchestrated into calls to registered services, both internal and external. One example is the creation of a service that takes an input document, performs a transformation on the document, extract some cognitive annotations or text from the original document and then store the results in a persisted service. Other transactions may enable a user to retrieve the original document and annotations, add comments or notes to the document and annotations and store these changes. Each of these action might be performed by different services, thus the "orchestration" of the transaction. The gateway API receives the original transaction request and then calls multiple other services on behalf of the client.

SUMMARY

As the Inventors herein have realized, one issue that has arisen with respect to API services and front-end servers is the handling and testing of error conditions that might occur when calling external services. For example, an external service may be offline when the API attempts to call the service.

Provided is a validation framework for modelling all the possible failures that might occur when an orchestrated transaction calls external services to ensure that error handling and reporting is robust and well designed. The disclosed techniques ensure that no changes are necessary to either the code making a call or the services that might be called. The techniques are not limited to web servers and REST APIs as they may be used to test and validate any kind of system that employs well defined APIs.

The claimed subject matter, or "validation framework" may be added to an existing API or created as a new module that acts as a proxy server in a non-micro service type of system. As should be clear to those with skill in the relevant arts, although described with respect to a gateway-API service, the claimed subject matter is equally applicable to other systems that process orchestrated transactions.

The validation framework provides the ability to test a set of system APIs with the injection of error data (payloads and return codes) without the need for any code changes to either the client calling the system or the server code that comprises the system.

Provided are techniques for managing communication in a distributed computing system, comprising retrieving, at a verification framework, return codes corresponding to a plurality of application programming interfaces (APIs), each API of the plurality of APIs corresponding to a corresponding service provider of a plurality service providers to generate a return code list; generating, by the verification framework, an erroneous call for a particular API of the plurality of APIs; a corresponding service provider of the plurality of service providers; transmitting the erroneous call to the particular API of the corresponding service provider; receiving, by the verification framework, a response from the corresponding service provider in response to the erroneous call; and verifying, by the verification framework, whether or not the response is a response that is expected based upon the return code list.

In accordance with the claimed subject matter, the functionality or capability of computing systems is improved by simplifying and automating the testing of components. Additionally, the functionality or capability of computing systems is improved by preventing a team of software engineers from spending time and utilizing computing resources (e.g., processing resources) attempting to identify and understand the errors that typically occur during development. By reducing the amount of computing resources being utilized by software developers from identifying and understanding such errors, computing resources are more efficiently utilized. The technical solution provided by the disclosed technology cannot be performed in the human mind or by a human using a pen and paper. That is, the technical solution provided by the claimed subject matter could not be accomplished in the human mind or by a human using a pen and paper in any reasonable amount of time and with any reasonable expectation of accuracy without the use of a computer.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
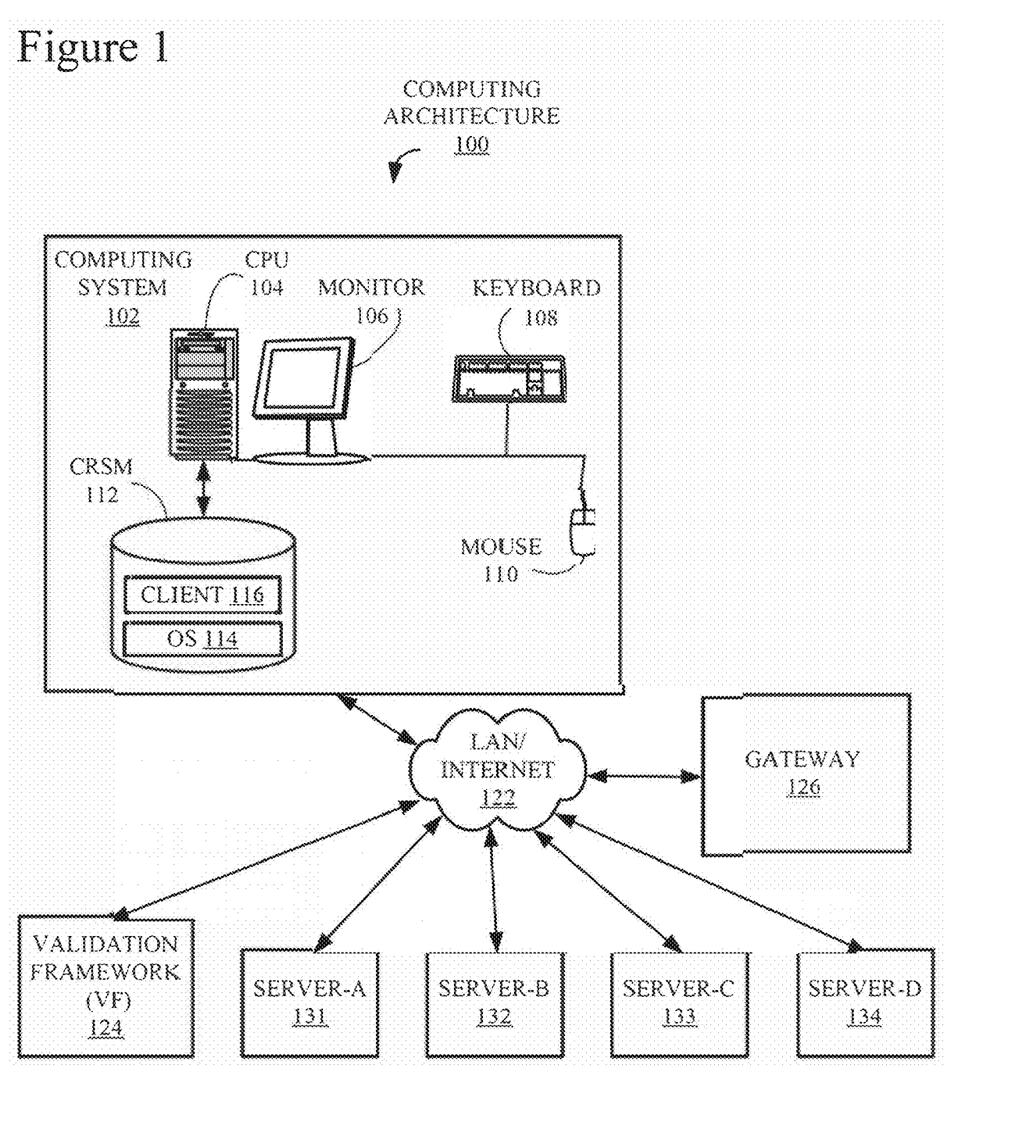
FIG. 1 is an illustration of one example of a Computing Architecture that may implement the claimed subject matter.

Turning now to the figures, FIG. 1 is an illustration of one example of a Computing Architecture that may implement the claimed subject matter. A computing system 102 includes a central processing unit (CPU) 104, coupled to a monitor 106, a keyboard 108 and a pointing device, or "mouse," 110, which together facilitate human interaction with elements of architecture 100 and computing system 102. Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown). CRSM 112 is illustrated storing an operating system (OS) 114 and a Client Application, or simply Client 116. Client 116 works in conjunction with a Validation Framework 124 and a Gateway 126.

Computing system 102 and Validation Framework 124 are connected to a Local Area Network (LAN)/Internet 122, which provides connectivity to Gateway 126. LAN/Internet 122. LAN/Internet 122 may represent any communication network or system known or yet to be known to those with skill in the relevant arts. In other words, the claimed subject matter works with both local communication systems such as a LAN and external communication systems such as the Internet.

Also coupled to the LAN/Internet 122 are a number of server devices, i.e. a Server-A 131, a Server-B 132, a Server-C 133 and a Server-D 134. Like computing system 102, servers 131-134 would typically include a CPU, monitor, keyboard, mouse and CRSM, which are not shown for the sake of simplicity. Although in this example, computing systems 102, Validation Framework 124, Gateway 126 and servers 131-134 are communicatively coupled via LAN/Internet 122, they could also be coupled through any number of communication mediums such as, but not limited to, a wide area network (WAN) (not shown), direct wire and wireless systems.

Computing Architecture 100 is merely used as one example of an architecture that would support the claimed Validation Framework described in the remainder of the Specification. It should be noted there are many possible computing system configurations, of which Computing Architecture 100 is only one simple example. A typical system would likely have many more components as a distributed, software system might be include the work of hundreds of devices spread over dozens of locations. The particular components shown in FIG. 1 are merely used as examples throughout the remainder of the Description.

Figure 2:
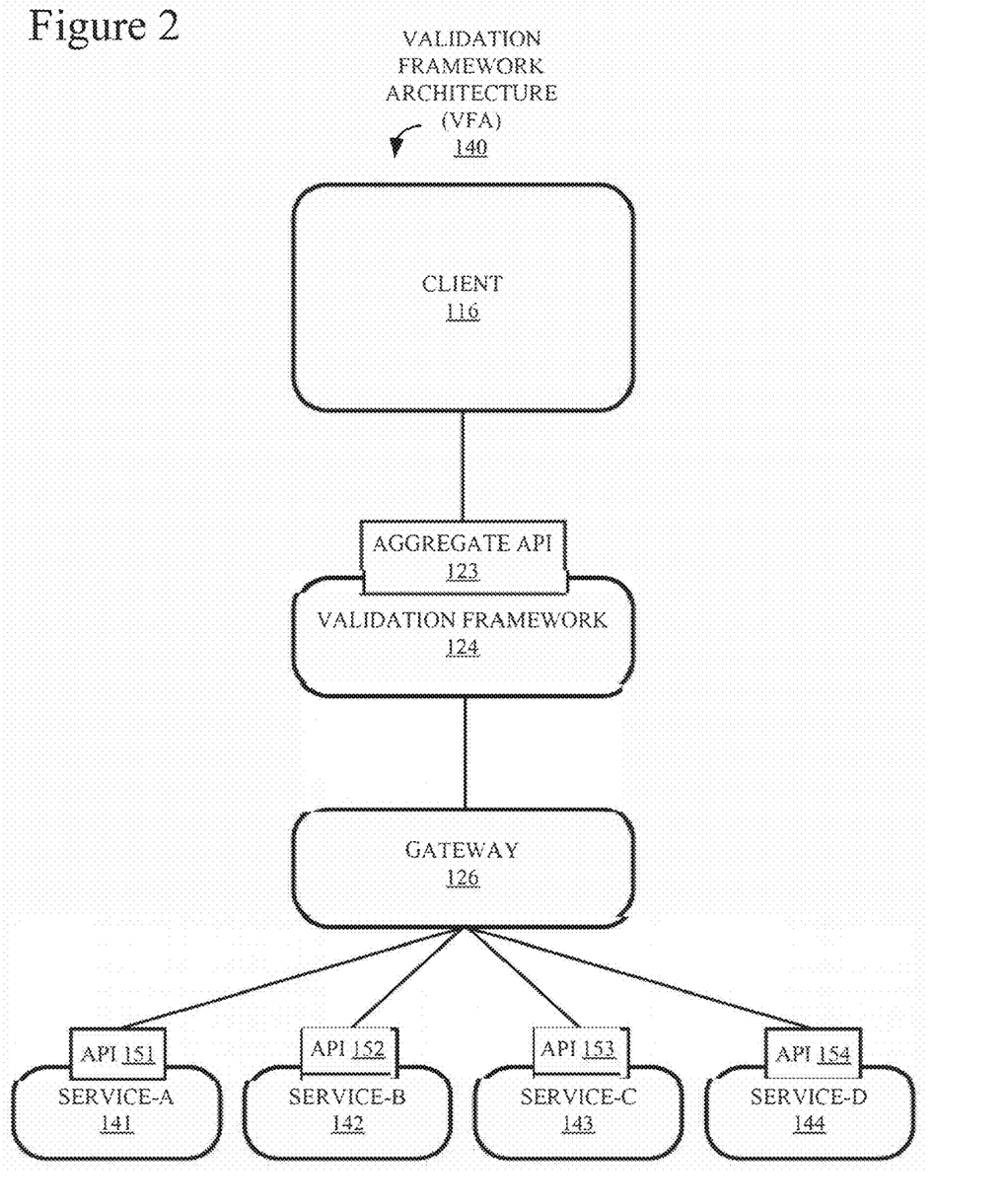
FIG. 2 is an illustration of one example of a Validation Framework Architecture (VFA) that may implement the claimed subject matter.

FIG. 2 is an illustration of one example of a Validation Framework Architecture (VFA) 140 that may implement the claimed subject matter. Client 116 (FIG. 1) communicates with Validation Framework 124 (FIG. 1), which is coupled to gateway 126 (FIG. 1), via an Aggregate Application Programming Interface (Aggregate API) 123. It should be understood that the use of Gateway 126 is just one example of a scenario that may employ the claimed subject matter. Subsequent figures show implementations that do not employ a gateway (see FIG. 4). For example, if gateway 126 does not exist in the system such Validation Framework 124 can directly call system services APIs.

Validation Framework 124 handles communication for Client 116 with a number of services, i.e. a Service-A 141, a Service-B 142, a Service-C 143 and a Service-D 144. In this example, Service-A 141 is hosted by Server-A 131 (FIG. 1), Service-B 142 by Server-B 132 (FIG. 1), Service-C 143 by Server-C 133 (FIG. 1) and Service-D 144 by Server-D 134 (FIG. 1). Each of Services 141-144 have an API, i.e. an API 151, an API 152, an API 153 and an API 154, respectively.

The claimed subject matter is primarily associated with Validation Framework 124. Client 116, Services 141-144 and APIs 151-154 are used as example of the elements that may benefit from the claimed subject matter as exemplified by Validation Framework 124. Validation Framework 124 is configured so that modifications to typical computing elements such as Client 116, Aggregate API 123, Gateway 126 (FIG. 1), Services 141-144 and APIs 151-154 are not necessary. As mentioned above, Validation Framework 124 is equally applicable to other types of elements than Aggregate APIs 123. It should be understood that although Validation Framework 124 is shown as a standalone element, Validation Framework 124 may also be incorporated into Gateway 126 or any other type of system, such as a proxy server, that typically handles orchestrated transactions to a single server.

Figure 3:
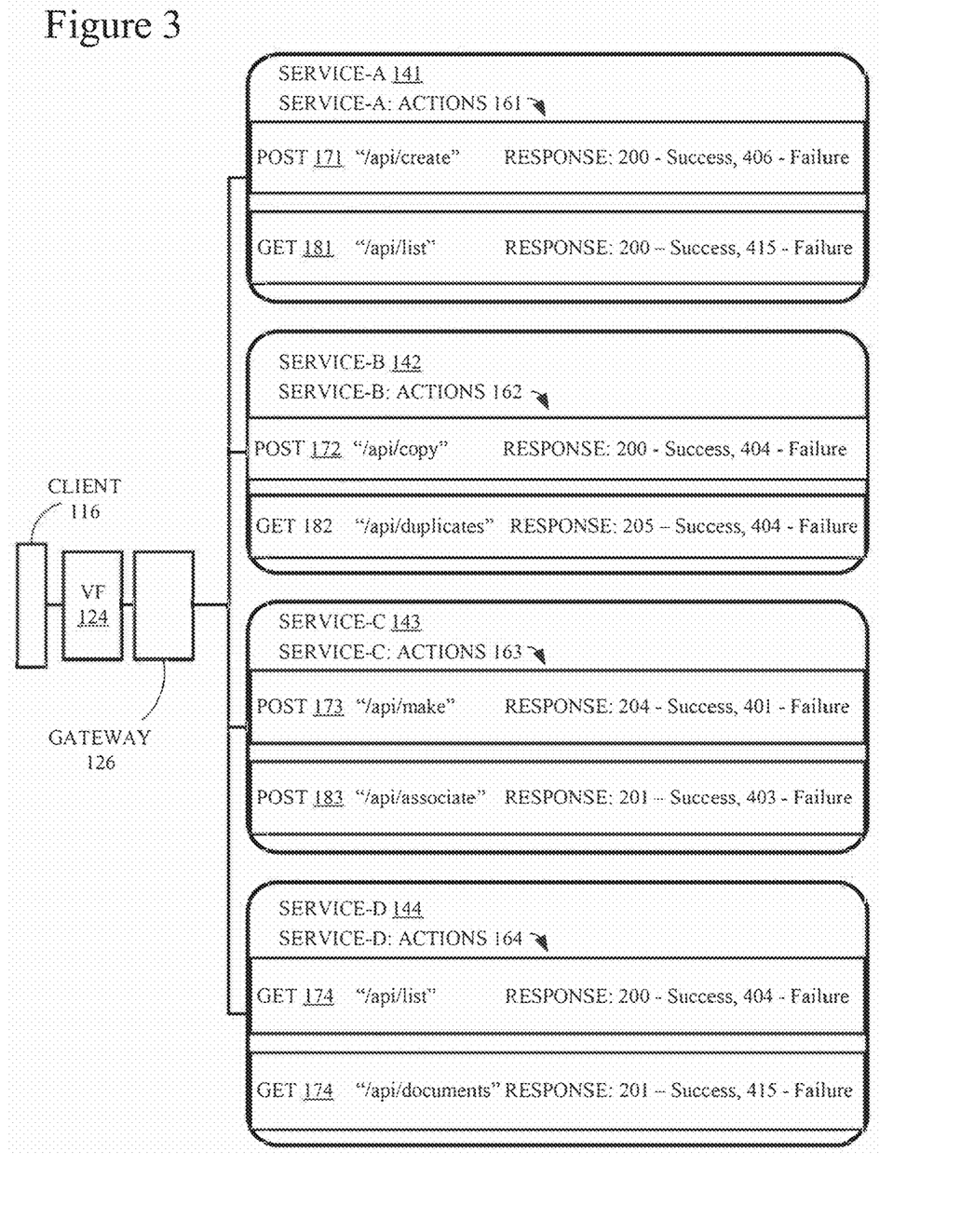
FIG. 3 is an illustration of examples of typical transaction that may be requested by the claimed Validation Framework.

FIG. 3 is an illustration of examples of typical services and corresponding actions that may be requested by Validation Framework (VF) 124 (FIGS. 1 & 2). A client, such as Client 116 (FIGS. 1 & 2), calls a system set of APIs, such as APIs 151-154 (FIG. 2), to perform particular functions. VF 124 is configured to act as a front-end proxy server for API Gateway 126 which the client normally would call directly. Client 116 does not need to know if it is calling VF 124 or API gateway 126 directly. For some system implementations API Gateway 126 is not included because Client 116 calls the services directly (see FIG. 4). In this example, VF 124 calls services 141-144 (FIG. 2) directly. VF 124 acts a proxy to directly call services 141-144 requested by Client 116 based on an input API signature.

Figure 4:
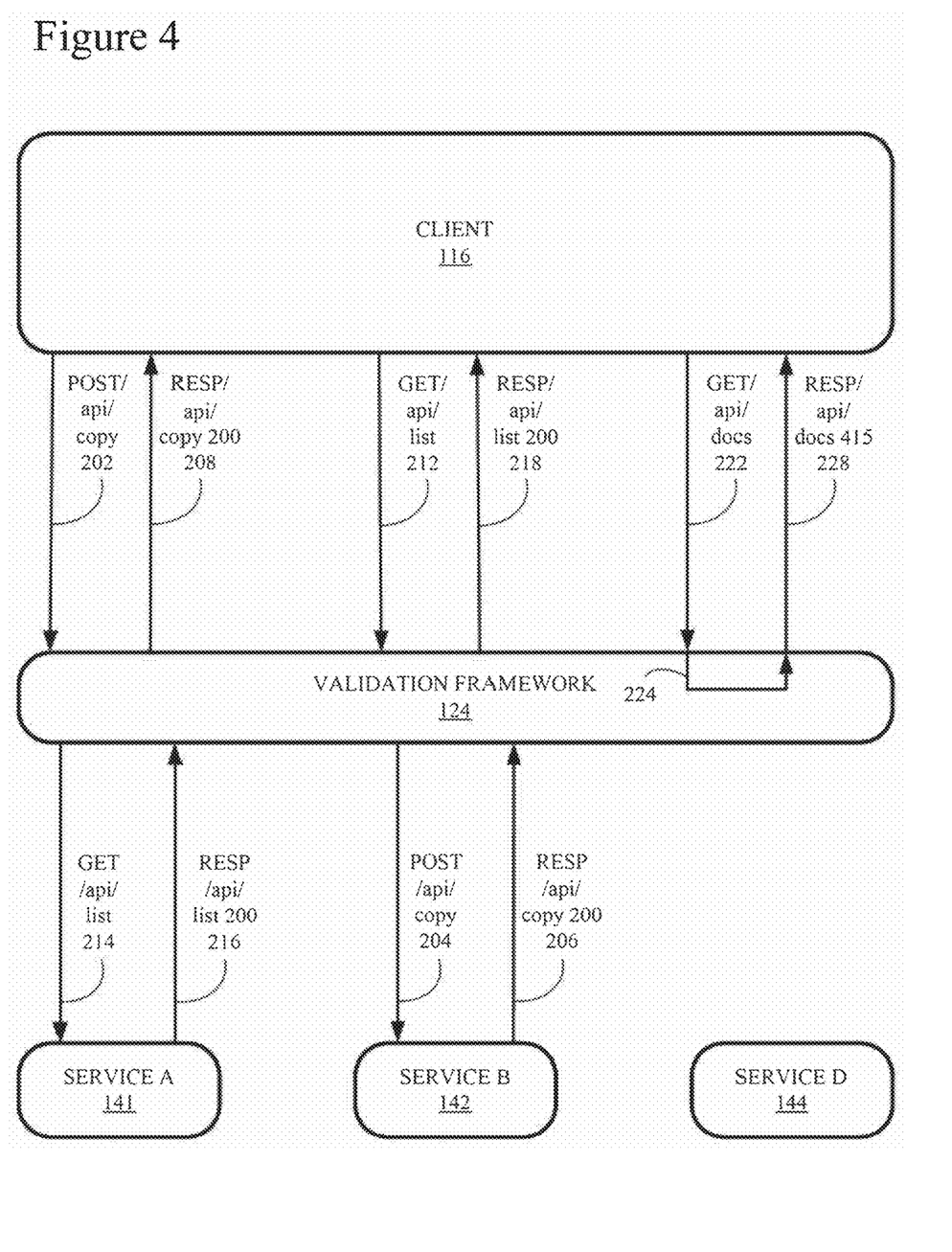
FIG. 4 is an illustration of typical transaction handling in the VFA of FIG. 2.

In this example all of the requests are sent directly to API Gateway 126, which then calls the specific service 141-144 needed. In the case that VF 124 is configured to inject an error, the processing of the input request and return value is done in VF 124 itself, and the requested call is never passed to Gateway 126. An example of this error injection is shown in FIG. 4. In this illustration, each service 141-144 is represented by a couple examples of actions, i.e., Service-A: Actions 161, Service-B: Actions 162, Service-C: Actions 163 and Service-D: Actions 164, respectively. A determination of whether or not VF 124 calls Gateway 126 is described in more detail below in FIGS. 4-10. Gateway 126 processes the calls from VF 124 into discrete service requests, each of which may be routed to a different service such as services 141-144 (FIG. 2). Gateway 126 then forwards each service request to a particular service 141-144.

Possible actions 161 of Service-A 141 include a "POST" 171 and a "GET" 181. POST 171 is called via an "/api/create" and returns a code "200" for success and a code "406" for failure. GET 181 is called via an "/api/list" and returns a code "200" for success and a code "415" for failure.

In a similar fashion, possible actions 162 of Service-B 142 include a "POST" 172 and a "GET" 182. POST 172 is called via an "/api/copy" and returns a code "200" for success and a code "404" for failure. GET 182 is called via an "/api/duplicates" and returns a code "205" for success and a code "404" for failure. Possible actions 163 of Service-C 143 include a "POST" 173 and a "POST" 183. POST 173 is called via an "/api/make" and returns a code "204" for success and a code "401" for failure. POST 183 is called via an "/api/associate" and returns a code "201" for success and a code "403" for failure. Possible actions 164 of Service-D 144 include a "GET" 174 and a "GET" 184 GET 174 is called via an "/api/list" and returns a code "200" for success and a code "404" for failure. GET 184 is called via an "/api/documents" and returns a code "201" for success and a code "415" for failure.

Services 141-144 and the specific actions 171-174 and 181-184 are merely examples used throughout the remainder of the Description. It should be understood a VFA 140 (FIG. 2) and web application systems might include many more services and associated actions than the limited number illustrated in these figures.

FIG. 4 is an illustration of typical transaction handling in VFA 140 of FIG. 2, including the actual injection of an error by VF 124 (FIGS. 1-3). Elements of FIG. 3 involved in FIG. 4 include Client 116 (FIGS. 1 & 2), VF 124, Service-A 141 (FIG. 2), Service-B 142 (FIG. 2) and Service-D 144 (FIG. 2). In this example, Aggregate API 123 (FIG. 2) and Gateway 126 (FIGS. 1 & 2) are not included showing that the VF 124 may be implemented in a system that does not include an API Gateway such as Gateway 126. In this example, Client 116 client would typically directly call endpoint services 141-144. In this example, VF 124 is configured in Client 116 to act as a proxy for end services 141-144.

Client 116 is shown making a call 202, i.e., POST "api/copy", which corresponds to POST 172 (FIG. 3). Call 202 is routed by VF 126 to Service-B 142 as a call 204. Service-B 142 responds with a response 206, which corresponds to RESP of POST 172, including a response code of "200" to indicate success. Response 206 is then returned to Client 116 via VF 124 in a response 208.

In a similar fashion, Client 116 makes a call 212, i.e., GET "api/list", which corresponds to GET 181 (FIG. 3). Call 212 is routed by VF 124 to Service-A 141 as a call 214. Service-A 141 responds with a response 216, including a response code of "200" to indicate success. Response 216 is then returned to Client 116 via VF 124 in a response 218.

A third call 222, corresponding to a GET "api/documents" call 174 (FIG. 3) is transmitted by Client 116 to VF 124 for Service-D 144. In this instance, in accordance with the claimed subject matter, VF 124 injects an error into the system that simulates that Service-D 144 has had an error. VF 124 is able to simulate a wide variety of errors for Service-D 141, for example that Service-D 144 is offline or the request has been incorrectly formatted. An administrator can define error scenarios in VF 124 for calls to Service-D 144. When a defined error has occurred, a client call 224 is not passed through to Service-D 144 but rather VF 124 directly returns a response 228 to Client 116 with the desired error condition. The creation of error response 224 is done by the VF 124 based on the error that is configured into VF 124 for the specific client request 222.

In this example, VF 124 creates a response RESP 228 corresponding to RESP of action 174, including the appropriate failure code "415." In other words, VF 124 has prevented a call to Service-D 144 by simulating an error that Service-D 144 would have otherwise returned. In this manner, calls to services 141-144 can be skipped and errors can be injected by VF 124. Another variant of the error injection that is not shown in FIG. 4 is that input request 222 payload could be modified by the validation framework to change the input data from valid to invalid values and then allow the call to pass through to Service D 144 to simulate the client passing invalid data to the service. In this manner, the claimed subject matter enables a developer to model and test failure scenarios by using configuration options of VF 124 without necessitating modifications to any other components, including, but not limited to, client 116, aggregate API 123, Gateway 126 and services 141-144. The only change needed to the system is to configure the VF 124 as the target internet protocol (IP) address for the server 141-144 Client 116 is calling. Examples of various configuration options are described below in conjunction with FIGS. 5-10.

Figure 5:
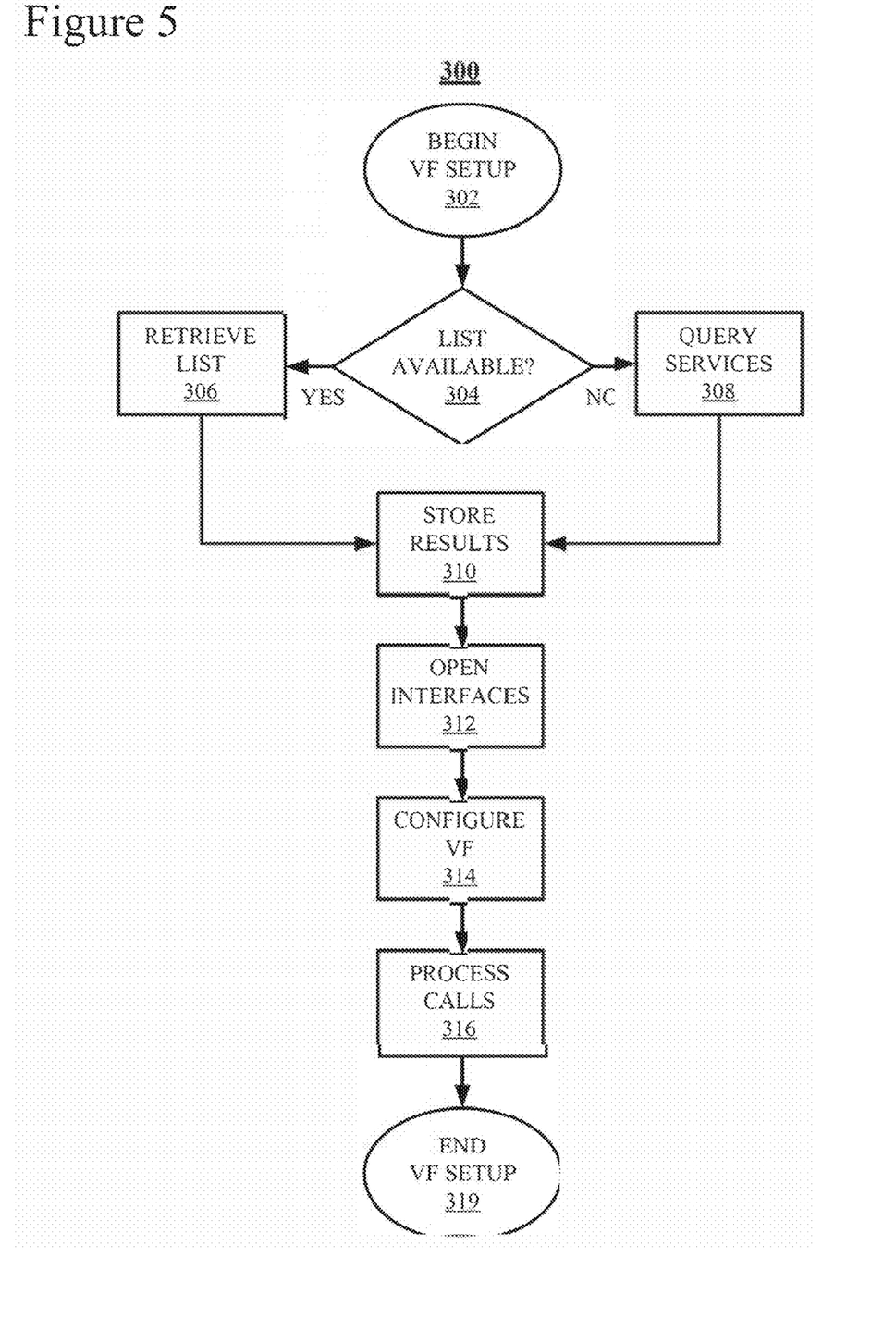
FIG. 5 is a flowchart of one example of an initial setup of the Validation Framework of FIGS. 1-4.

FIG. 5 is a flowchart of one example of a "Validation Framework (VF) Setup" process 300 that may implement aspects of the claimed subject matter. In this example, logic associated with process 300 is stored on a non-transitory, computer-readable storage medium (CRSM) (not shown) and executed on processors (not shown) associated with VF 124 (FIGS. 1-4).

Process 300 starts in a "Begin VF Setup" block 302 and proceeds immediately to a "List Available?" block 304. During processing associated with block 304, a determination is made as to whether or not VF 124 has access to a list of possible endpoints, such as APIs 151-154 (FIG. 2), and services, such as Services 141-144 (FIG. 2). In short, VF 124 may have access to information needed to perform a setup by having the information stored when VF 124 was developed, stored from previous implementations or VF 124 may request the information from another entity such as a registration server (not shown). Another option is a configuration file can be supplied with the list of targeted services such as services 141-144 (FIG. 2). If a list is available, control proceeds to a "Retrieve List" block 306 during which the information is retrieved from wherever the information is stored. If, during processing associated with block 304, a determinations is made that there is no list, control proceeds to a "Query Services" block 308. During processing associated with block 308, VF 124, or in the alternative Gateway 126 (FIGS. 1-3), query servers, such as server 131-134 (FIG. 1) by configuring a server name, host IP, port and interface to return a list of possible interfaces.

During processing associated with a "Store Results" block 310, VF 124 stores the list of services collected during processing associated with either block 306 or 308 in a proxy-list. During processing associated with an "Open Interfaces" block 312, opens an interface with a single host:port with all the endpoint interfaces in the proxy-list.

So far, process 300 is performing the setup of a Virtual Framework service that sits in front of an gateway-API service. During processing associated with a "Configure VF" block 314, process 300 introduces logic to perform the claimed subject matter as described below in conjunction with FIGS. 6-10. It should be understood that in this example, VF 124 is used in conjunction with an API-gateway but that it may be implemented as a standalone device that intercepts calls between Client 116 (FIGS. 1-3) and end point services where no gateway exists. In addition, the claimed subject matter enables testing of interfaces without modification to Client 116 and Services 141-144 are necessary. The only system change needed to add the Validation Framework 124 is the configuration of IP addresses of the targeted servers, i.e., to use a VP 124 IP address in place of the normal system server IP addresses, i.e., API Gateway 126 server and/or Service 141-144 IP addresses).

During processing associated with a "Process Calls" block 316, calls from Client 116 to services 141-144 are intercepted and processed in accordance with the claimed subject matter as described below Finally, during processing associated with an "End VF Setup" block 319, process 300 is complete.

Figure 6:
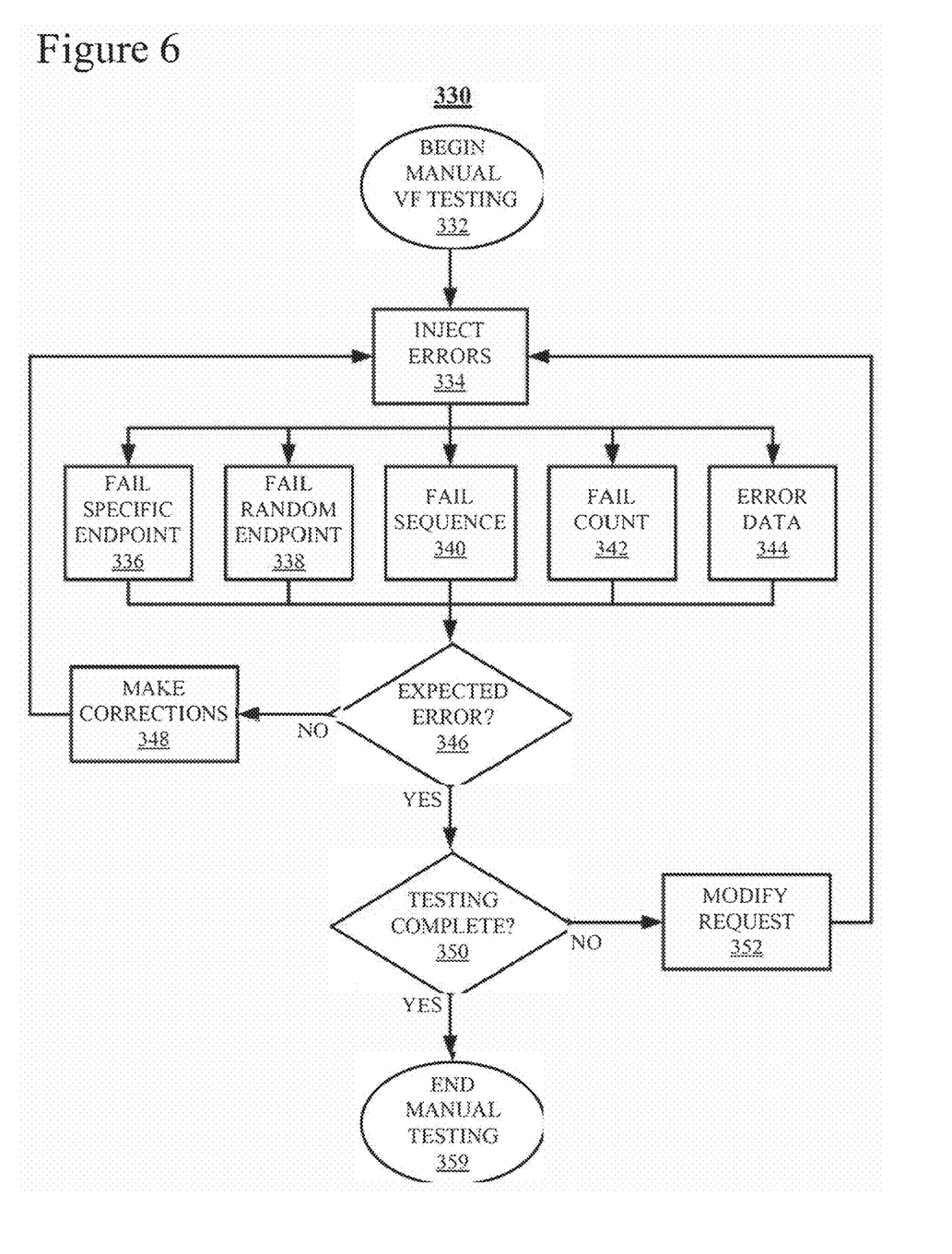
FIG. 6 is a flowchart of one example of an manual testing setup of the Validation Framework of FIGS. 1-4.

FIG. 6 is a flowchart of one example of a "Manual VF Testing" process 330 that may implement aspects of the claimed subject matter. Like process 300 (FIG. 5), in this example, logic associated with process 330 is stored on a non-transitory, computer-readable storage medium (CRSM) (not shown) and executed on processors (not shown) associated with either one or both VF 124 (FIGS. 1-4) and Gateway (FIGS. 1-3), depending upon the particular implementation.

Process 330 starts in a "Begin Manual VF Testing" block 332 and proceeds immediately to an "Inject Errors" block 334. During processing associated with block 334, an administrator employs VF 124 test-injection interfaces (not shown) to configure VF 124 to introduce the types of errors desired. The test-injection interface may implemented as configuration file read by VF 124 to set the types of errors to be injected. Another example is VF 124 supporting a configuration API that allows an admin client to set the desired error scenarios. Examples of types of errors that may be introduced include, but are not limited to, failing a specific end-point API, failing a random end-point API, failing a sequence of calls, failing a specific count of calls and failing based upon erroneous data. These five choices are represented in process 300 as a "Fail Specific Endpoint" block 336, a "Fail Random Endpoint" block 338, a "Fail Sequence" block 340, a "Fail Count" block 342 and a "Error Data" block 344.

During processing associated with "Fail Specific Endpoint" block 336, a specific endpoint is either not called but rather a failure code is automatically returned to client 116 or the endpoint is called but the return payload is injected with errors. During processing associated with "Fail Random Endpoint" block 338, the specific endpoint is never called but rather the failure code is returned to Client 116. During processing associated with "Fail Sequence" block 340, an error in introduced into any part of a sequence of calls. For example, if a particular transaction is defined as a sequence of six (6) calls to different endpoints, an error is injected into the third ($3^{rd}$) API call. During processing associated with "Fail Count" block 342, an api-call is allowed to complete a set number of calls but on the $n^{th}$ call an error is introduced. During processing associated with "Error Data" block 344, a payload of a call by Client 116 is modified, the call is made to the specified endpoint and the error that is detected and indicated in a response is simply returned to Client 116.

During processing associated with an "Expected Error?" block 346, a determination is made whether or not the error returned from the call or non-call that results from blocks 336, 338, 340, 342 or 344 is that which was expected. If not, control proceeds to a "Make Corrections" block 348. During processing associated with block 348, the specific element responsible for the erroneous return call is identified and modified if necessary. The error may be the result of VF 124, Gateway 126 or one of APIs 151-154 (FIG. 2) or services 141-144. Control then returns to Inject Errors block 334 and processing continues as described above.

During processing associated with a "Testing Complete?" block 350, a determination is made as to whether or not sufficient testing has been performed. If not, control proceeds to a "Modify Request" block 352 during which the administrator may reconfigure VF 124 to introduce a different error. Control then returns to "Inject Errors" block 334 and processing continues as described above. Finally, if during processing associated with block 350, a determination is made that testing is complete, control proceeds to an "End Manual VF Testing" block 359 in which process 330 is complete.

It should be noted that with respect to process 330 as well as processes 360, 380, 400 and 430, described below, the claimed subject matter enables testing of error handling and processing by Client 116, Gateway 126, services 141-144 and APIs 151-154 without any modification to these elements that would be necessary to introduce the various errors that might occur.

Figure 7:
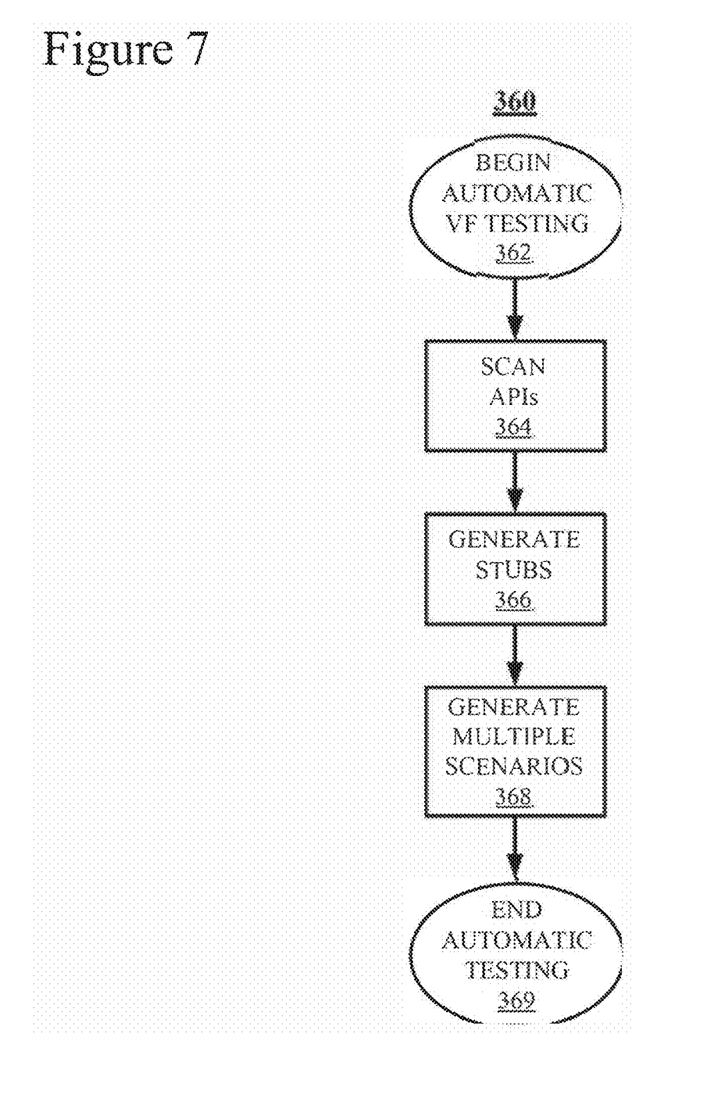
FIG. 7 is a flowchart of one example of an automatic testing setup of the Validation Framework of FIGS. 1-4.

FIG. 7 is a flowchart of one example of a "Automatic VF Testing" process 360 that may implement aspects of the claimed subject matter. Like process 300 (FIG. 5), in this example, logic associated with process 360 is stored on a non-transitory, computer-readable storage medium (CRSM) (not shown) and executed on processors (not shown) associated with VF 124 (FIGS. 1-4).

Process 360 starts in a "Begin Automatic VF Testing" block 362 and proceeds immediately to a "Scan APIs" block 364. During processing associated with block 364, VF 124 scans the list of APIs (see 304, 306, 308 & 310, FIG. 5) for exposed and historical error codes and payloads from runtime logs and generates a list of potential, or candidate, test cases. During processing associated with a "Generate Stubs" block 366, VF 124 generates either unit tests, which function as a direct caller to the APIs, or functional tests, which walk up a callstack from the API caller, or both. Generated stubs are then populated with test-injection code to enable specified faults.

During processing associated with a "Generate Multiple Scenarios" block 368, VF 124 generates all possible error scenarios. These error scenarios may be prioritized so that those most likely to occur are generated first. In this mode, VF 124 sets its own faults. It should be noted that one or the other of blocks 366 and 368 may be executed rather than both. Finally, during processing associated with an "End Automatic VF Testing" block 369, process 360 is complete.

Figure 8:
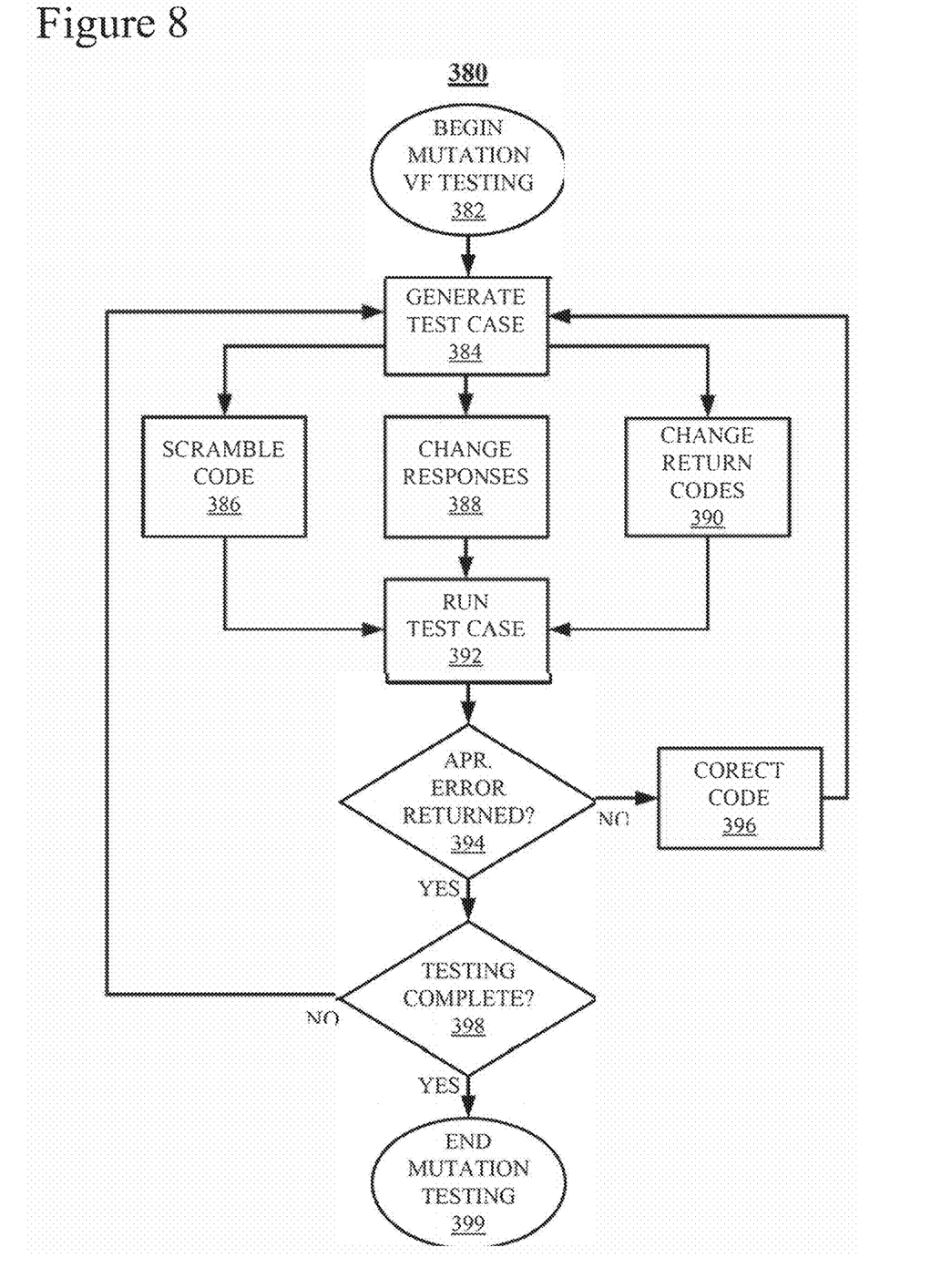
FIG. 8 is a flowchart of one example of mutation testing by the Validation Framework of FIGS. 1-4.

FIG. 8 is a flowchart of one example of a "Mutation VF Testing" process 380 that may implement aspects of the claimed subject matter. Like processes 300 (FIG. 5) and 360 (FIG. 7), in this example, logic associated with process 380 is stored on a non-transitory, computer-readable storage medium (CRSM) (not shown) and executed on processors (not shown) associated with VF 124 (FIGS. 1-4)

Process 380 starts in a "Begin Mutation Testing" block 382 and proceeds immediately to a "Generate Test Case" block 384. During processing associated with block 384, an administrator configures VF 124 to configure VF 124 to generate the types of errors desired. Examples of ways in which types of errors may be introduced include, but are not limited to, scrambling code, changing response bodies and mutating API return codes. These three (3) choices are represented in process 380 as a "Scramble Code" block 386, a "Change Responses" block 388 and a "Change Return Codes" block 390.

During processing associated with a "Run Test Case" block 392, VF 124 runs the test case selected, i.e., the test represented by either block 386, 388 or 390. During processing associated with an "Appropriate (Apr.) Error Returned?" block 394, a determination is made as to whether or not an appropriates return code has been returned when the test case was run in conjunction with block 392. If not, control proceeds to a "Correct Code" block 396, during which the code that returns the inappropriate error code is modified. Control then returns to "Generate Test Case" block 384 and processing continues as described above.

If, during processing associated with block 394, a determination is made that an appropriate error code was returned, control proceeds to a "Testing Compete?" block 398. During processing associated with block 398, a determination is made as to whether or not more tests are needed. If so, control returns to "Generate Test Case" block 384 and processing continues as described above. If so, control proceeds to an "End Mutation Testing" block 399 in which process 380 is complete.

Figure 9:
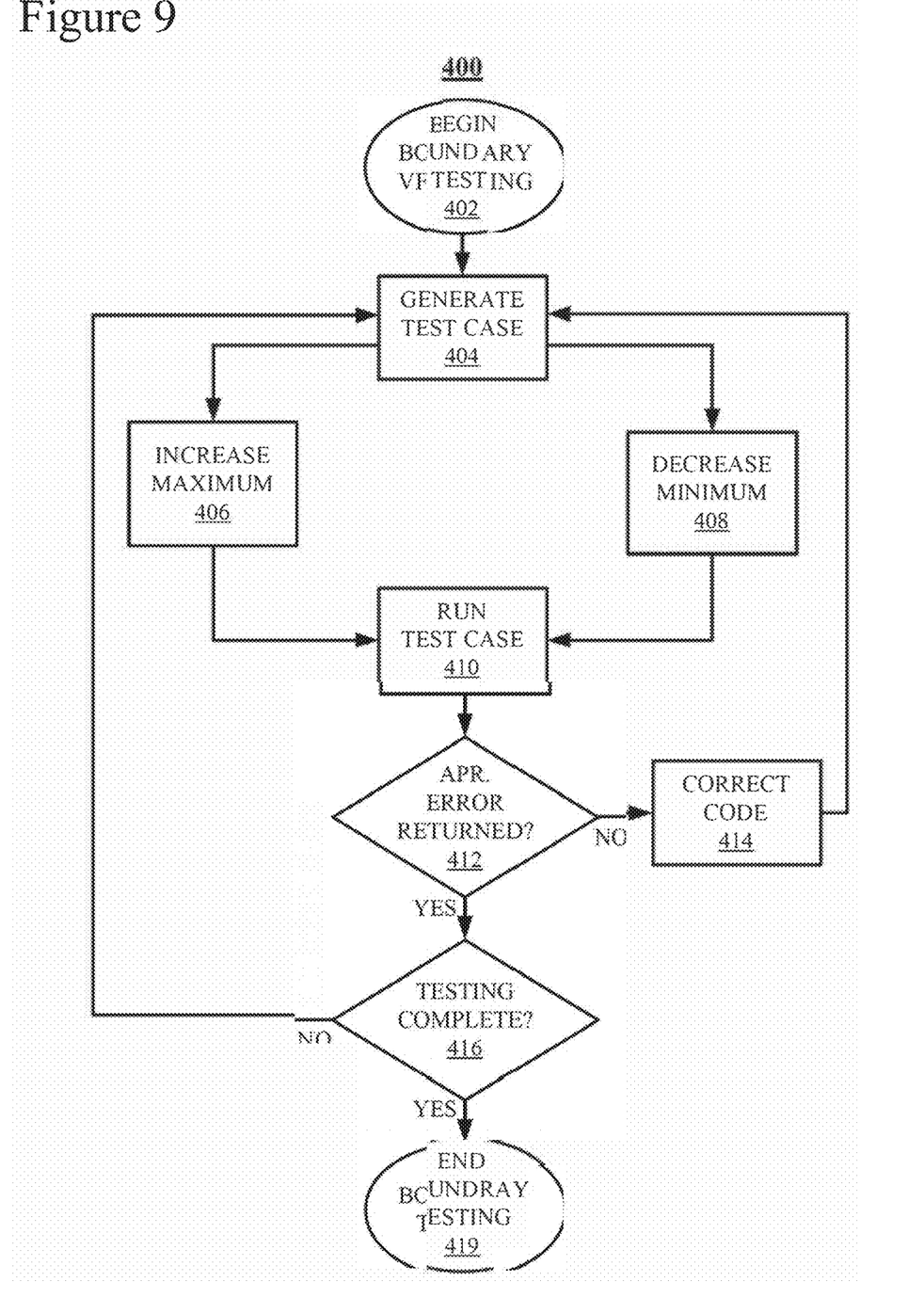
FIG. 9 is a flowchart of one example of boundary testing by the Validation Framework of FIGS. 1-4.

FIG. 9 is a flowchart of one example of a "Boundary Testing" process 400 that may implement aspects of the claimed subject matter. Like processes 300 (FIG. 5), 360 (FIG. 7) and 380 (FIG. 8), in this example, logic associated with process 400 is stored on a non-transitory, computer-readable storage medium (CRSM) (not shown) and executed on processors (not shown) associated with VF 124 (FIGS. 1-4)

Process 400 starts in a "Begin Boundary Testing" block 402 and proceeds immediately to a "Generate Test Case" block 404. During processing associated with block 404, an administrator configures VF 124 to configure VF 124 to generate the types of errors desired. Examples of ways in which types of errors may be introduced include, but are not limited to, increasing the maximum limits on range values and decreasing minimum value on range values that are in the client API requests from the input API requests processed by the VF 124. These two (2) choices are represented in process 400 as a "Increase Maximum" block 406 and a "Decrease Minimum" block 408. In these modes, input API parameters are configured to overwrite actual client input parameters values, using values just over or just under the maximum or minimum values, respectively. These modified vales are then passed to an endpoint server so that normal error handling can occur. Maximum and minimum parameter values are typically published in interface documentation as a swagger specification or javadoc for the interfaces being tested. These published values may be used to generate edge/boundary testing conditions.

During processing associated with a "Run Test Case" block 410, VF 124 runs the test case selected, i.e., the test represented by either block 406 or 408. During processing associated with an "Appropriate (Apr.) Error Returned?" block 412, a determination is made as to whether or not an appropriates return code has been returned when the test case was run in conjunction with block 410. If not, control proceeds to a "Correct Code" block 414, during which the code that returns the inappropriate error code is modified. Control then returns to "Generate Test Case" block 404 and processing continues as described above.

If, during processing associated with block 412, a determination is made that an appropriate error code was returned, control proceeds to a "Testing Compete?" block 416. During processing associated with block 416, a determination is made as to whether or not more tests are needed. If so, control returns to "Generate Test Case" block 404 and processing continues as described above. If not, control proceeds to an "End Mutation Testing" block 419 in which process 400 is complete.

Figure 10:
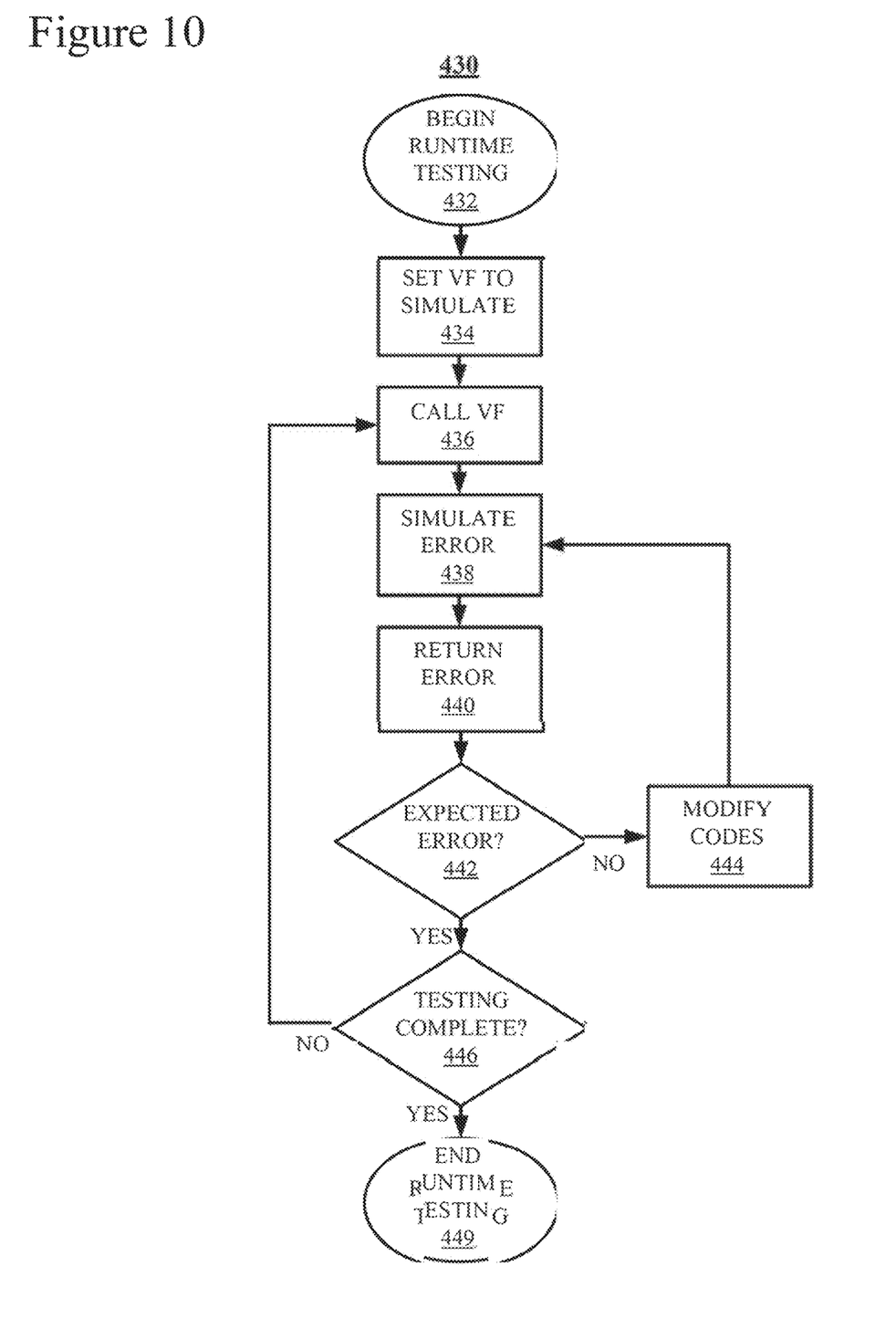
FIG. 10 is a flowchart of one example of runtime testing by the Validation Framework of FIGS. 1-4.

FIG. 10 is a flowchart of one example of "Runtime Testing" process 430 that may implement aspects of the claimed subject matter. Like processes 300 (FIG. 5), 360 (FIG. 7), 380 (FIG. 8) and 400 (FIG. 9), in this example, logic associated with process 430 is stored on a non-transitory, computer-readable storage medium (CRSM) (not shown) and executed on processors (not shown) associated with VF 124 (FIGS. 1-4). It should be noted that processes 300, 360, 380 and 400 are primarily involved with testing VF 124 to ensure proper operation prior to implementation and that process 430 represents one embodiment of the use of VF 124 to test other elements such as Client 116 (FIGS. 1-4) and Gateway 126 (FIGS. 1 &3). As explained above, the use of VFR 124 to test Client 116 does not require modifications to Aggregate API 125, Gateway 126, services 141-144 (FIGS. 2 & 4) or APIs 151-154 (FIG. 2).

Process 430 starts in a "Begin Runtime Testing" block 432 and proceeds immediately to a "Set VF to Simulate" block 434. During processing associated with block 434, an administrator or developer configures VF 124 to simulate the specific errors that are to be tested. The tests described above in conjunction with FIGS. 5-9 may also be used in conjunction with process 430 to test Client 116. The configuration of VF 124 to inject particular types of errors for testing may be performed using an API. In the alternative, VF 124 may include a graphical user interface (GUI) (not shown) to enable this functionality.

During processing associated with a "Call VF" block 436, VF 124 is called to begin the testing based upon the configuration established during processing associated with block 434. During processing associated with a "Simulate Error" block 438, a call containing the error condition corresponding to the established configuration is sent to the element being tested. During processing associated with a "Return Error" block 440, the error code for the call made during processing associated with block 438 from the element being tested is returned to VF 124.

During processing associated with an "Expected Error?" block 442, a determination is made as to whether or not the error code returned during processing associated with block 440 is the appropriate code. If not, during processing associated with a "Modify Codes" block 444, the element being tested is modified to correct the anomaly and control returns to Simulate Error block 438 and processing continues as described above.

If the error code is as expected during processing associated with block 441, control proceeds to a "Testing Complete?" block 446. If, during processing associated with block 446, a determination is made that an appropriate error code was returned, control proceeds to a "Testing Compete?" block 446. During processing associated with block 446, a determination is made as to whether or not more tests are needed. If so, control returns to "Call VF" block 436 and processing continues as described above. If not, control proceeds to an "End Runtime Testing" block 449 in which process 430 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing communication in a distributed computing system, the method comprising:
   retrieving, by one or more computer processors, return codes for a plurality of application programming interfaces (APIs), each API of the plurality of APIs corresponding to a corresponding service provider of a plurality service providers to generate a return code list;
   generating, by one or more computer processors, an erroneous call for an API of the plurality of APIs;
   transmitting, by one or more computer processors, the erroneous call to the API;
   receiving, by one or more computer processors, a response to the erroneous call; and
   comparing, by one or more computer processors, the response to an expected response in the return code list.

2. The method of claim 1, further comprising:
   intercepting, by one or more computer processors, a call from a client to the particular API; and
   modifying, by one or more computer processors, the call to generate the erroneous call.

3. The method of claim 2, further comprising:
   generating, by one or more computer processors, an erroneous response to the API; and
   determining, by one or more computer processors, whether or not the client handles the erroneous call appropriately.

4. The method of claim 2, further comprising:
   determining, by one or more computer processors, that the call would fail if transmitted to the API;
   determining, by one or more computer processors, a failure code based on the return codes for the call and the API;
   generating, by one or more computer processors, a response based upon the failure code; and
   transmitting, by one or more computer processors, the response to the client rather than generating and transmitting the erroneous call to the API.

5. The method of claim 1, the retrieving of error handling codes comprising:
   querying, by one or more computer processors, each API of the plurality of APIs to generate the return code list; and
   storing, by one or more computer processors, the return code list.

6. The method of claim 1, the retrieving of return codes comprising:
   querying, by one or more computer processors, a registration server to retrieve the return code list; and
   storing, by one or more computer processors, the return code list.

7. The method of claim 1, wherein the erroneous call is based upon any of a list of possible errors, the list selected from the group consisting of: erroneous payload data; erroneous code data; a maximum value greater than a permissible maximum value; and a minimum value greater than a permissible minimum value.

8. A computer program product for managing communication in a distributed computing system, the computer program product comprising:
   one or more computer readable storage media; and
   program instructions stored on the one or more computer readable storage media, the program instructions comprising:
      retrieve a return codes for a plurality of application programming interfaces (APIs), each API of the plurality of APIs corresponding to a corresponding service provider of a plurality service providers to generate a return code list;
      generate an erroneous call for an API of the plurality of APIs;
      transmit the erroneous call to the API;
      receive a response to the erroneous call; and
      compare the response to an expected response in the return code list.

9. The computer program product of claim 8, further comprising program instructions stored on the one or more computer readable storage media, the program instructions to:
   intercept a call from a client to the particular API; and
   modify the call to generate the erroneous call.

10. The computer program product of claim 9, further comprising program instructions stored on the one or more computer readable storage media, the program instructions to:
    generate an erroneous response to the API; and
    determine whether or not the client handles the erroneous call appropriately.

11. The computer program product of claim 9, further comprising program instructions stored on the one or more computer readable storage media, the program instructions to:
    determine that the call would fail if transmitted to the API;
    determine a failure code based on the return codes for the call and the API;
    generate a response based upon the failure code; and
    transmit the response to the client rather than generating and transmitting the erroneous call to the API.

12. The computer program product of claim 8, the retrieving of error handling codes comprising:
    program instructions to query each API of the plurality of APIs to generate the return code list; and
    program instructions to store the return code list.

13. The computer program product of claim 8, the retrieving of return codes comprising:
    program instructions to query a registration server to retrieve the return code list; and
    program instructions to store the return code list.

14. The computer program product of claim 8, wherein the erroneous call is based upon any of a list of possible errors, the list selected from the group consisting of: erroneous payload data; erroneous code data; a maximum value greater than a permissible maximum value; and a minimum value greater than a permissible minimum value.

15. A computer system for managing communication in a distributed computing system, the computer program product comprising:
- one or more computer processors;
- one or more computer readable storage media; and
- program instructions stored on the one or more computer readable storage media for execution by at least one of the one or more computer processors, the program instructions comprising:
  - retrieve a return codes for a plurality of application programming interfaces (APIs), each API of the plurality of APIs corresponding to a corresponding service provider of a plurality service providers to generate a return code list;
  - generate an erroneous call for an API of the plurality of APIs;
  - transmit the erroneous call to the API;
  - receive a response to the erroneous call; and
  - compare the response to an expected response in the return code list.

16. The computer system of claim 15, further comprising program instructions stored on the one or more computer readable storage media for execution by at least one of the one or more computer processors, the program instructions comprising:
- intercept a call from a client to the particular API; and
- modify the call to generate the erroneous call.

17. The computer system of claim 16, further comprising program instructions stored on the one or more computer readable storage media for execution by at least one of the one or more computer processors, the program instructions comprising:
- generate an erroneous response to the API; and
- determine whether or not the client handles the erroneous call appropriately.

18. The computer system of claim 16, further comprising program instructions stored on the one or more computer readable storage media for execution by at least one of the one or more computer processors, the program instructions comprising:
- determine that the call would fail if transmitted to the API;
- determine a failure code based on the return codes for the call and the API;
- generate a response based upon the failure code; and
- transmit the response to the client rather than generating and transmitting the erroneous call to the API.

19. The computer system of claim 15, the retrieving of error handling codes comprising:
- program instructions to query each API of the plurality of APIs to generate the return code list; and
- program instructions to store the return code list.

20. The computer system of claim 15, the retrieving of return codes comprising:
- program instructions to query a registration server to retrieve the return code list; and
- program instructions to store the return code list.

* * * * *